(12) United States Patent
Mori et al.

(10) Patent No.: US 7,614,221 B2
(45) Date of Patent: Nov. 10, 2009

(54) EXHAUST PURIFICATION DEVICE AND AN EXHAUST PURIFICATION METHOD OF AN INTERNAL COMBUSTION ENGINE

(75) Inventors: Kouichi Mori, Ayase (JP); Takao Inoue, Yokohama (JP); Sunki I, Yamato (JP); Shunichi Mitsuishi, Isehara (JP)

(73) Assignee: Nissan Motor Co., Ltd., Yokohama, Kanagawa (JP)

( * ) Notice: Subject to any disclaimer, the term of this patent is extended or adjusted under 35 U.S.C. 154(b) by 470 days.

(21) Appl. No.: 11/351,343

(22) Filed: Feb. 9, 2006

(65) Prior Publication Data

US 2006/0174607 A1 Aug. 10, 2006

(30) Foreign Application Priority Data

Feb. 10, 2005 (JP) ............................. 2005-033786

(51) Int. Cl.
*F01N 3/00* (2006.01)
(52) U.S. Cl. .................. 60/299; 60/274; 60/296; 60/305; 60/312
(58) Field of Classification Search .................. 60/299, 60/312, 274, 282, 287, 296, 305, 313
See application file for complete search history.

(56) References Cited

U.S. PATENT DOCUMENTS 6,334,306 B1 * 1/2002 Mori et al. .................... 60/297
6,397,586 B1 * 6/2002 Sakurai et al. ................ 60/288
2001/0010804 A1 8/2001 Majima

FOREIGN PATENT DOCUMENTS

| JP | 5-026081 | 2/1993 |
| JP | 9-273417 | 10/1997 |
| JP | 2001-173437 | 6/2001 |

\* cited by examiner

*Primary Examiner*—Binh Q Tran
(74) *Attorney, Agent, or Firm*—Young Basile

(57) ABSTRACT

An exhaust system for an internal combustion engine includes a catalytic device within an exhaust path of the engine, wherein the catalytic device includes a housing with a catalyst carrier. A length of the catalyst carrier along a longitudinal axis, measured along a downstream flow direction of exhaust gas within the exhaust path, is substantially the same or a shorter than the upstream distance traveled by a reverse flow of exhaust gas during an exhaust gas pulsation within the housing. With this type of configuration, due to reciprocating movements of the exhaust gas caused by the pulsations, the same exhaust gas passes through the catalyst carrier multiple times. Thus, an increased number of heat exchanges take place within the catalyst carrier, which rapidly increases the catalyst temperature after a cold engine start.

19 Claims, 6 Drawing Sheets

EXHAUST PURIFICATION DEVICE AND AN EXHAUST PURIFICATION METHOD OF AN INTERNAL COMBUSTION ENGINE

This application claims priority from Japanese Patent Application No. 2005-033786, filed Feb. 10, 2005, the entire contents of which is incorporated herein by reference.

TECHNICAL FIELD

The invention relates to exhaust purification in internal-combustion engines.

BACKGROUND

Conventional internal-combustion engines include an exhaust system with a catalytic device that purifies exhaust gases generated by the engine. Conventional catalytic devices include a housing, a monolithic ceramic catalyst carrier structure in the housing, and a catalytic metal retained in the carrier. The purification efficiency of the catalytic metal increases when the catalysts are heated, so to reduce cold-start exhaust emissions the catalysts must be brought up to temperature as soon as possible.

SUMMARY

In one aspect, an exhaust system for an internal combustion engine includes a catalytic device within an exhaust path of the engine, wherein the catalytic device includes a housing with a catalyst carrier. A length of the catalyst carrier along a longitudinal axis, measured along a downstream flow direction of exhaust gas within the exhaust path, is substantially the same or a shorter than an upstream distance traveled by a reverse flow of exhaust gas during an exhaust gas pulsation within the housing.

With this type of configuration, due to reciprocating movements of the exhaust gas caused by the pulsations, the same exhaust gas passes through the catalyst carrier multiple times. Thus, an increased number of heat exchanges take place within the catalyst carrier, which rapidly increases the catalyst temperature, particularly after a cold engine start.

Another embodiment is a method of purifying exhaust gas generated by an internal-combustion engine, including providing a catalytic device in an exhaust path through which the exhaust gas flows. The catalytic device includes a catalyst carrier in a housing, and the exhaust gas flows an upstream distance along an upstream flow direction during an exhaust gas pulsation within the housing. The catalyst carrier has a length along a longitudinal axis, measured along a downstream flow direction of the exhaust gas within the exhaust path, substantially the same or shorter than the upstream distance such that the exhaust gas reverses flow a first time near a downstream end of the carrier and reverses flow a second time near an upstream end of the carrier. The exhaust gas is repeatedly flowed through the carrier to increase the temperature of the catalytic device.

Yet another embodiment is a method of purifying exhaust gas generated by an internal-combustion engine, including providing a catalytic device in an exhaust path through which the exhaust gas flows. The catalytic device includes a first catalyst carrier in a housing, and a second catalyst carrier in the housing arranged a predetermined distance along a longitudinal axis downstream of the first catalyst carrier, measured along a downstream flow direction of exhaust gas within the exhaust path, downstream of the first catalyst carrier. The exhaust gas flows a reverse flow distance in an upstream direction during an exhaust gas pulsation within the housing. The first catalyst carrier has a length along a longitudinal axis, measured along a downstream flow direction of the exhaust gas within the exhaust path. The length of the first catalyst carrier is substantially the same or shorter than the reverse flow distance such that the exhaust gas reverses flow a first time near a downstream end of the first catalyst carrier and reverses flow a second time near an upstream end of the first catalyst carrier. A predetermined distance between the first carrier and the second carrier is selected to be substantially the same or longer than the reverse flow distance. The exhaust gas is repeatedly flowed through the first carrier to increase the temperature of the catalytic device.

Yet another embodiment is a catalytic device for purifying exhaust gas generated by an internal combustion engine. The device includes a catalyst carrier with a length along a longitudinal axis, measured along a downstream flow direction of exhaust gas within the exhaust path, substantially the same or shorter than a reverse flow distance along an upstream direction traveled by exhaust gas during an exhaust gas pulsation within the device.

In another embodiment, a method of purifying exhaust gas generated by an internal-combustion engine includes providing a catalytic device in an exhaust path through which the exhaust gas flows. The catalytic device includes a first catalyst carrier in a housing, and a second catalyst carrier in the housing arranged a predetermined distance along a longitudinal axis downstream of the first catalyst carrier, measured along a downstream flow direction of exhaust gas within the exhaust path. The method further provides means for generating a reverse exhaust gas flow in the catalytic device, wherein the means for generating causes the exhaust gas to flow a reverse flow distance along an upstream direction during an exhaust gas pulsation within the housing. A length of the first carrier along a longitudinal axis, measured along a downstream flow direction of the exhaust gas within the exhaust path, is selected to be substantially the same or shorter than the reverse flow distance, such that the exhaust gas reverses flow a first time near a downstream end of the first carrier and reverses flow a second time near an upstream end of the first carrier. A predetermined distance between the first carrier and the second carrier is selected to be substantially the same or longer than the reverse flow distance. The exhaust gas is repeatedly flowed through the first carrier to increase the temperature of the catalytic device.

The details of one or more embodiments of the invention are set forth in the accompanying drawings and the description below. Other features, objects, and advantages of the invention will be apparent from the description and drawings, and from the claims.

DETAILED DESCRIPTION

By effectively using exhaust reverse-flow caused by pulsations in the exhaust system, the heat of the exhaust gas can be more effectively delivered to the upstream and downstream catalyst carriers in the catalytic device. As a result, after a cold engine start, the temperature of the catalysts in the carriers increases rapidly. This rapid increase in catalyst temperature initiates exhaust purification at an early stage and reduces cold-start emissions.

Figure 1:
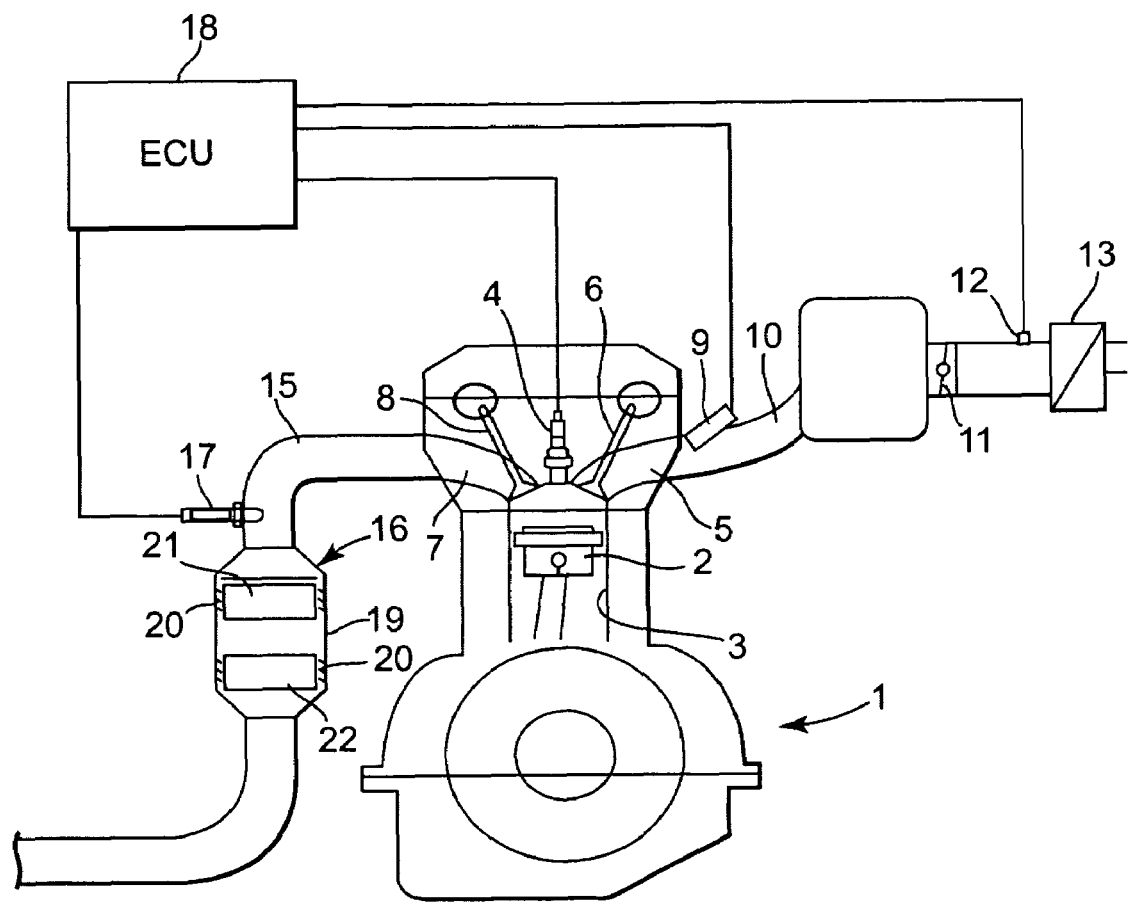
FIG. 1 is a schematic cross-sectional view of an exemplary exhaust purification device consistent with the principles of the invention.

FIG. 1 is a block diagram illustrating exemplary configuration of an exhaust purification device. An internal-combustion engine 1, for example, may be an in-line four-cylinder spark ignition gasoline engine including a cylinder 3 with a reciprocating piston 2, an ignition plug 4, an inlet valve 6 to open and close an inlet port 5, an exhaust valve 8 to open and close an exhaust port 7, and a fuel injection valve 9 to inject fuel into the inlet port 5. In the upstream side of an inlet path 10 that is to be connected to the inlet port 5, a throttle valve 11, an air-flow meter 12, and an air cleaner 13 are installed.

A catalytic device 16 is positioned within an exhaust path 15 connected to the exhaust port 7. Catalytic device 16 may use a catalyst such as a three-way catalyst. An air-fuel ratio sensor 17 may be positioned upstream of catalytic device 16. In addition, an engine control unit 18 (ECU) controls fuel injection quantity, ignition timing, and the like. Catalytic device 16 may have a substantially cylindrically shaped housing 19 with a larger path cross-section than the preceding/following exhaust path 15. One or more ceramic monolithic catalyst carriers may be arranged in series within housing 19. Two such catalyst carriers 21 and 22 are illustrated in FIG. 1, with a space between the catalyst carriers 21 and 22. The catalyst carriers 21 and 22 respectively may be retained at given axial positions in the housing 19, and in the housing 19 designated spaces may be maintained in front of and behind the catalyst carriers 21 and 22 via peripheral annular holding members 20.

Figure 2:
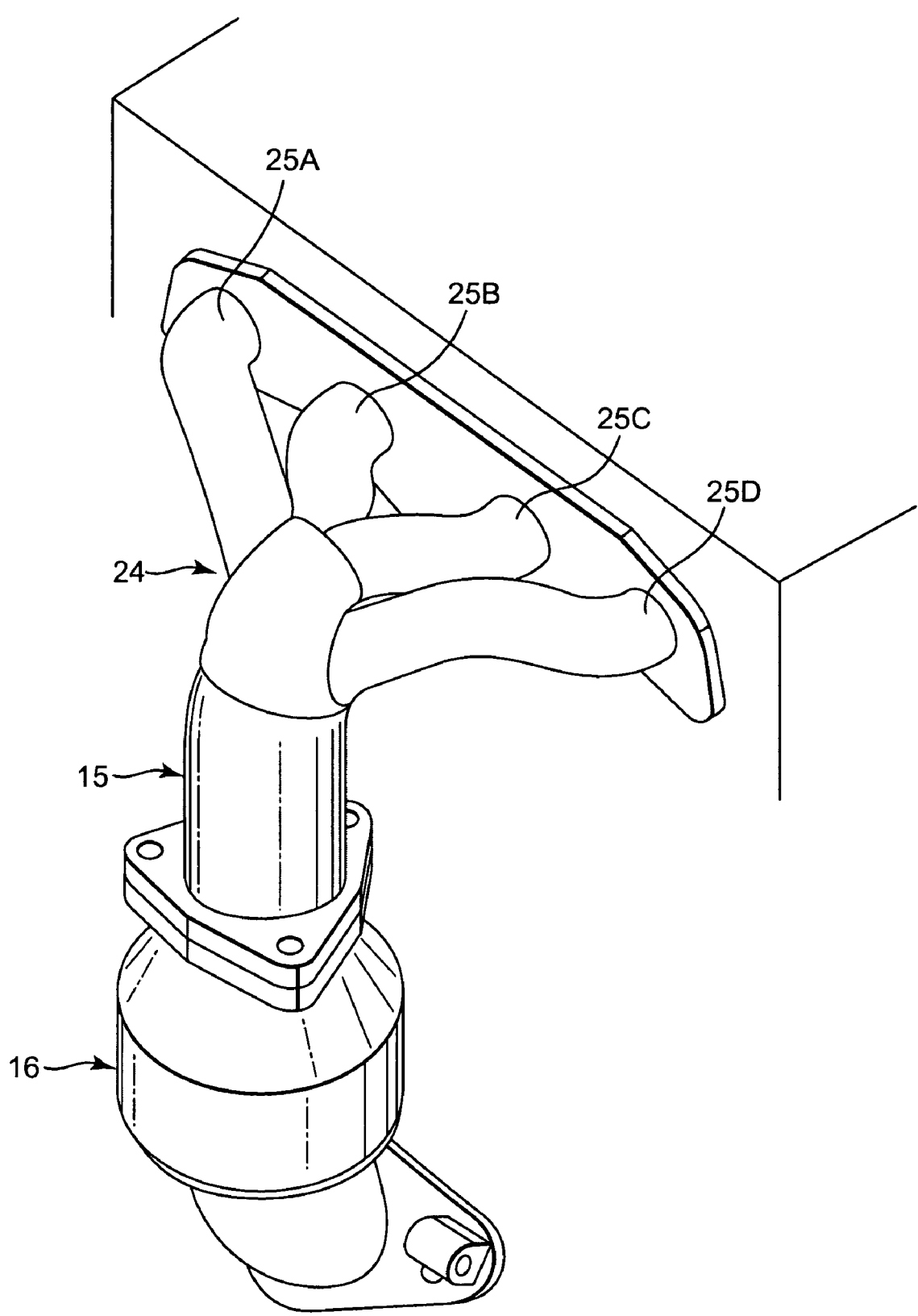
FIG. 2 is a perspective view of an exemplary embodiment of an exhaust manifold uses upstream of the exhaust purification device.

FIG. 2 illustrates an exemplary embodiment of an exhaust manifold 24 of an exemplary exhaust purification device. As illustrated in FIG. 2, an upstream part of the exhaust path 15 connected to the exhaust port 7 is typically an exhaust manifold 24. The catalytic device 16 may be installed further downstream from a merging point at which branch paths 25A-25D of individual cylinders merge into one flow path. As a result, exhaust pulsations, having a peak every 180 degrees in terms of crankshaft angle, may act on the catalytic device 16. Pulsations in the flow of exhaust generate a reverse-flow of the exhaust, in which the exhaust flows a certain distance in a reverse direction upstream along the exhaust path 15.

Further additional means can be employed to enhance the exhaust reverse flow. For example, a cyclical pressure increase in the exhaust path at the downstream side of the catalyst can be employed so that the pressure is increased at certain timing synchronized with the exhaust reverse flow so as to support and enhance the exhaust reverse flow. The cyclical pressure increase may be generated by, for example, a pulse valve or an impulse charger installed in the exhaust path at the downstream side of the catalyst.

Figure 3:
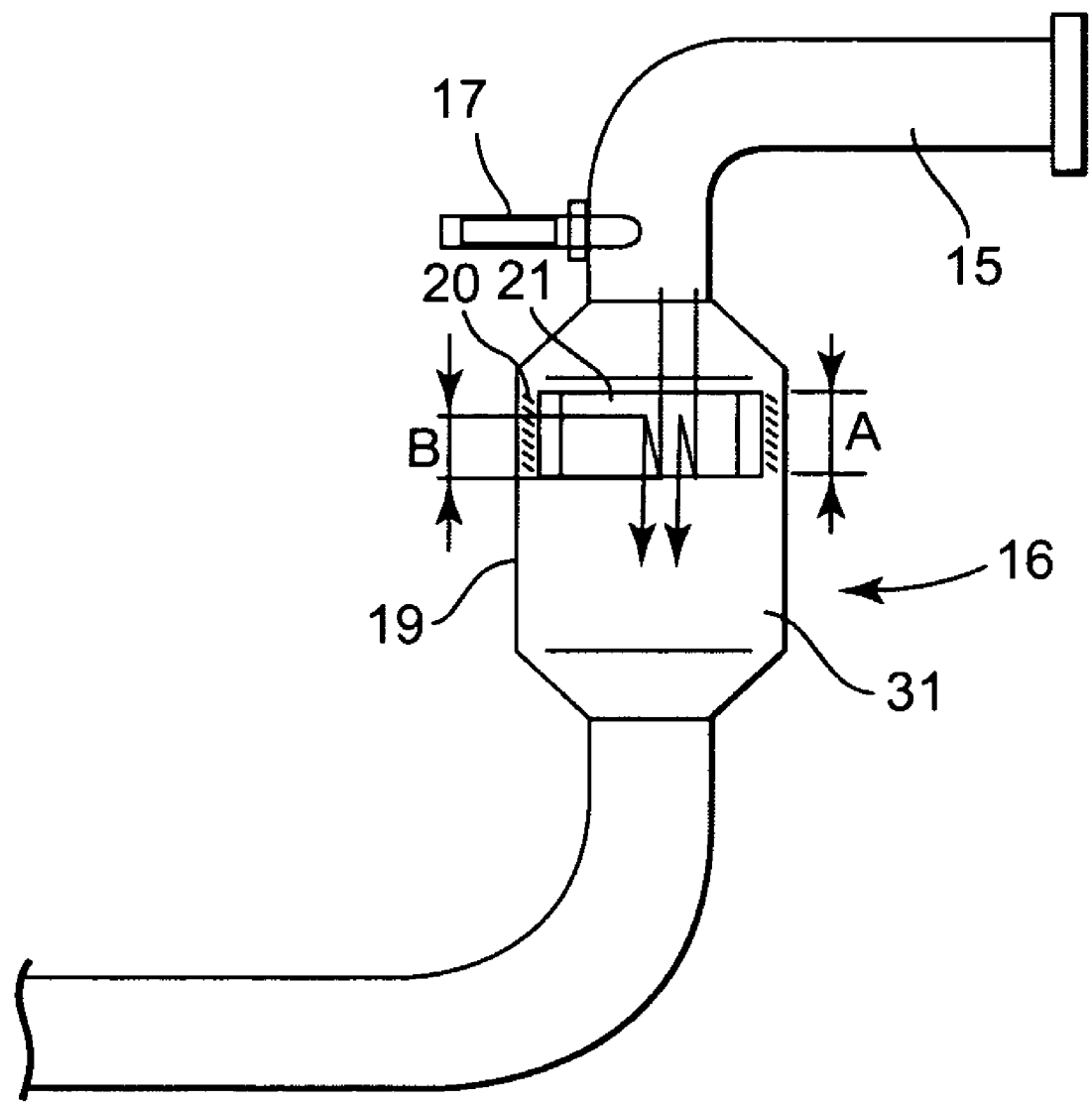
FIG. 3 is a schematic cross-sectional view of an exemplary catalytic device.

FIG. 3 illustrates an exemplary embodiment of a catalytic device. FIG. 3 illustrates an embodiment of the catalytic device 16 equipped with a single catalyst carrier 21. As illustrated, the catalyst carrier 21 is fixed slightly upstream within the housing 19, downstream of which is a space 31. The length A represents a longitudinal axial length of the catalyst carrier 21, measured along the downstream direction of flow of exhaust gas through the path 15. The length B represents a distance the exhaust gas travels in an upstream direction, opposite the downstream direction, along the exhaust path 15 during a reverse flow of exhaust gas that occurs during each exhaust gas pulsation in the housing 19. For example, the length A may be within a preferred range of between 10 mm and 45 mm, and within a more preferred range of between 30 mm and 45 mm when taking into account the strength of the catalyst carrier. When additional equipment such as a pulse valve or impulse charge is employed, the length A may be within a broad range of between 10 mm and 150 mm, and more preferably between 30 mm and 100 mm.

In this embodiment, the length A of catalyst carrier 21 may be made substantially the same as or shorter than the longitudinal axial length B. For example, if the length B is 40 mm, the difference A minus B may be preferably within a range of between 5 mm and −30 mm. The minimum value of the range of length A can be somewhat larger when taking into account the strength of the catalyst carrier. More preferably, the length A is substantially the same as the length B. Thus, if the length A of the catalyst carrier 21 is substantially the same as or less than the distance B that the exhaust gas travels upstream as its reverses flow during an exhaust pulsation, the reciprocating movements of the exhaust gas pulsation cause the same exhaust gas to pass through the catalyst carrier 21 multiple times. The multiple traversals increase the number of heat exchanges per unit time that take place with the catalyst carrier 21. As a result, the catalyst temperature increases rapidly after a cold engine start.

In addition, the shorter the length A of the catalyst carrier 21, the more intensive the temperature rise. However, an intensive temperature rise may weaken the strength of catalyst carrier 21, and so the length A should preferably be selected taking into account both catalytic strength and temperature rise requirements.

Furthermore, the upstream distance B traveled by the exhaust gas during a reverse-flow may change depending on the operational conditions of the internal-combustion engine 1. However, exhaust pulsations when there is a low load, i.e. a small throttle opening, are preferably used as a standard for determining the distance B. As a result, for example, a rapid temperature rise of the catalyst carrier 21 while idling after a cold engine start can be achieved.

By arranging two or more pressure gauges in the exhaust path along the direction of the exhaust flow, and analyzing the detected pressures along a time axis, the exhaust reverse flow distance B can be determined experimentally. Because air flow resistance increases as the length of the catalyst carrier 21 increases, the length A of the catalyst carrier 21 and the best position of catalyst carrier 21 within the exhaust path 15 can be determined.

The flow velocity distribution including the exhaust reverse flow pulsations can also be simulated by a computer program. For example, software such as the GT-Power Engine Simulation Tool available from Gamma Technologies, Inc., of Westmont, Ill. may be used.

The exhaust reverse-flow pulsations may also be observed by fabricating the exhaust path 15 and the housing 19 of a transparent or translucent material. Fluorescent or reflective material may be used when the engine is being rotated by firing or motoring to make the exhaust flow visible.

Figure 4:
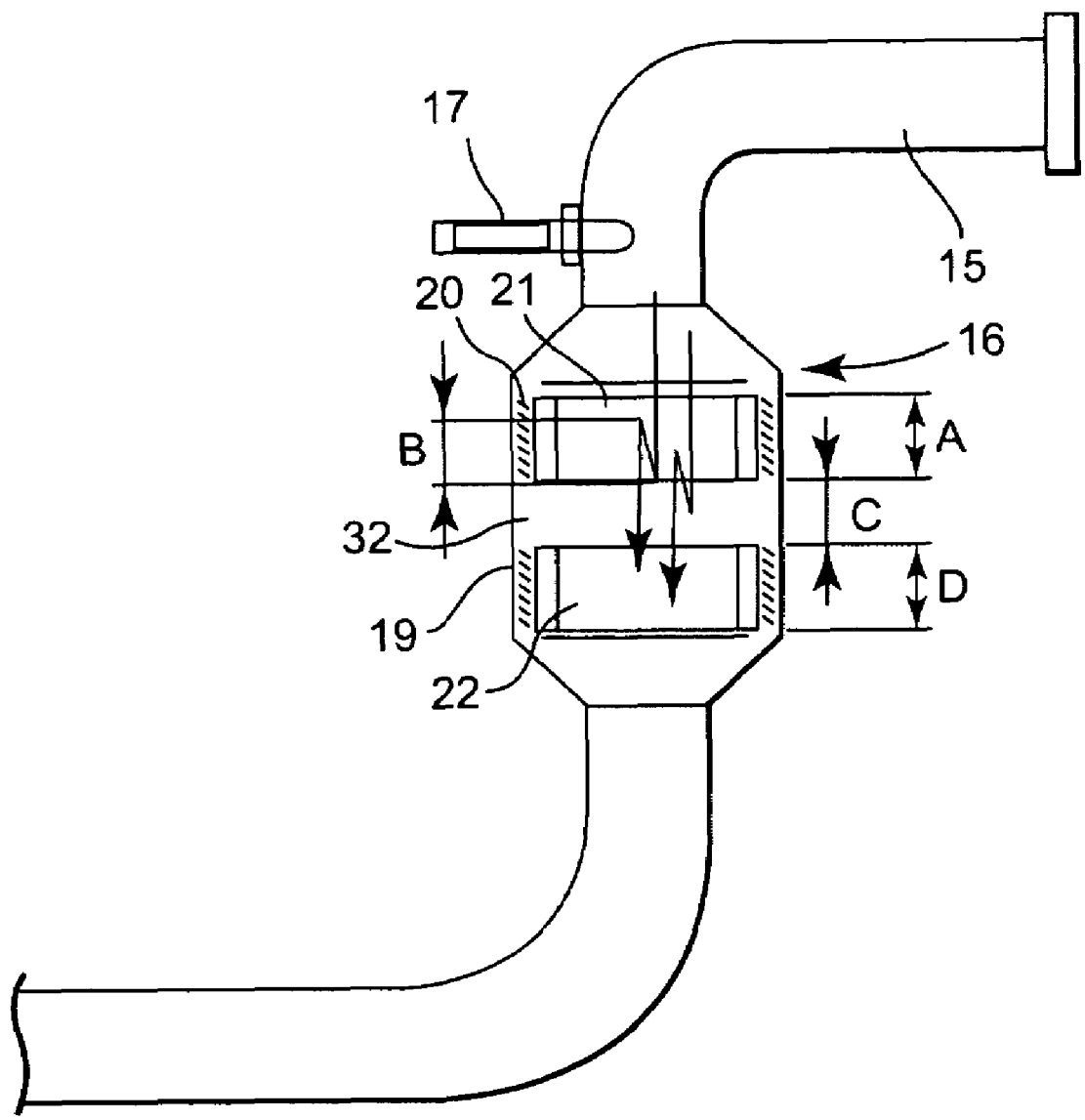
FIG. 4 is a schematic cross-sectional view of another exemplary catalytic device.

FIG. 4 illustrates another exemplary embodiment of a catalytic device including a catalytic device 16 equipped with two catalyst carriers 21 and 22. The catalyst carrier 21 is fixed in a position slightly upstream within the housing 19 with respect to the catalyst carrier 22, and a space 32 is maintained between them. Herein, the longitudinal axial length C of the space 32 (in other words, the distance between the end surfaces of the two catalyst carriers, 21 and 22), as illustrated, is substantially the same as or longer than the upstream distance B traveled by the exhaust gas during a reverse-flow generated by pulsations in the housing 19.

Again, the distance C between the carriers 21 and 22 is preferably substantially the same as the distance B. For example, the difference between the length C and the length B may be preferably within a range of between 0 mm and 30 mm, and more preferably the length C is the same as the length B.

As a result, exhaust gas that has passed through the upstream catalyst carrier 21 flows back to the upstream catalyst carrier 21 by reversing direction before reaching the second catalyst carrier 22 located downstream. Without losing heat to the downstream catalyst carrier 22, the exhaust gas passes through the upstream catalyst carrier 21 multiple times, thus intensively raising the temperature of the upstream catalyst carrier 21. In other words, the exhaust gas near the downstream end of the catalyst carrier 21 from the end of an exhaust reverse-flow does not pass through catalyst carrier 22 at the beginning of a reverse-flow until the gas reaches near the downstream end of the catalyst carrier 21.

In addition to adjusting the distance C, the longitudinal axial length A of the upstream catalyst carrier 21 may optionally be the same as or shorter than the upstream distance traveled by the exhaust reverse-flow B, as already described. Moreover, the longitudinal axial length D of the downstream catalyst carrier 22 is also preferably substantially the same as or shorter than the upstream distance B of the exhaust reverse-flow.

Figure 5:
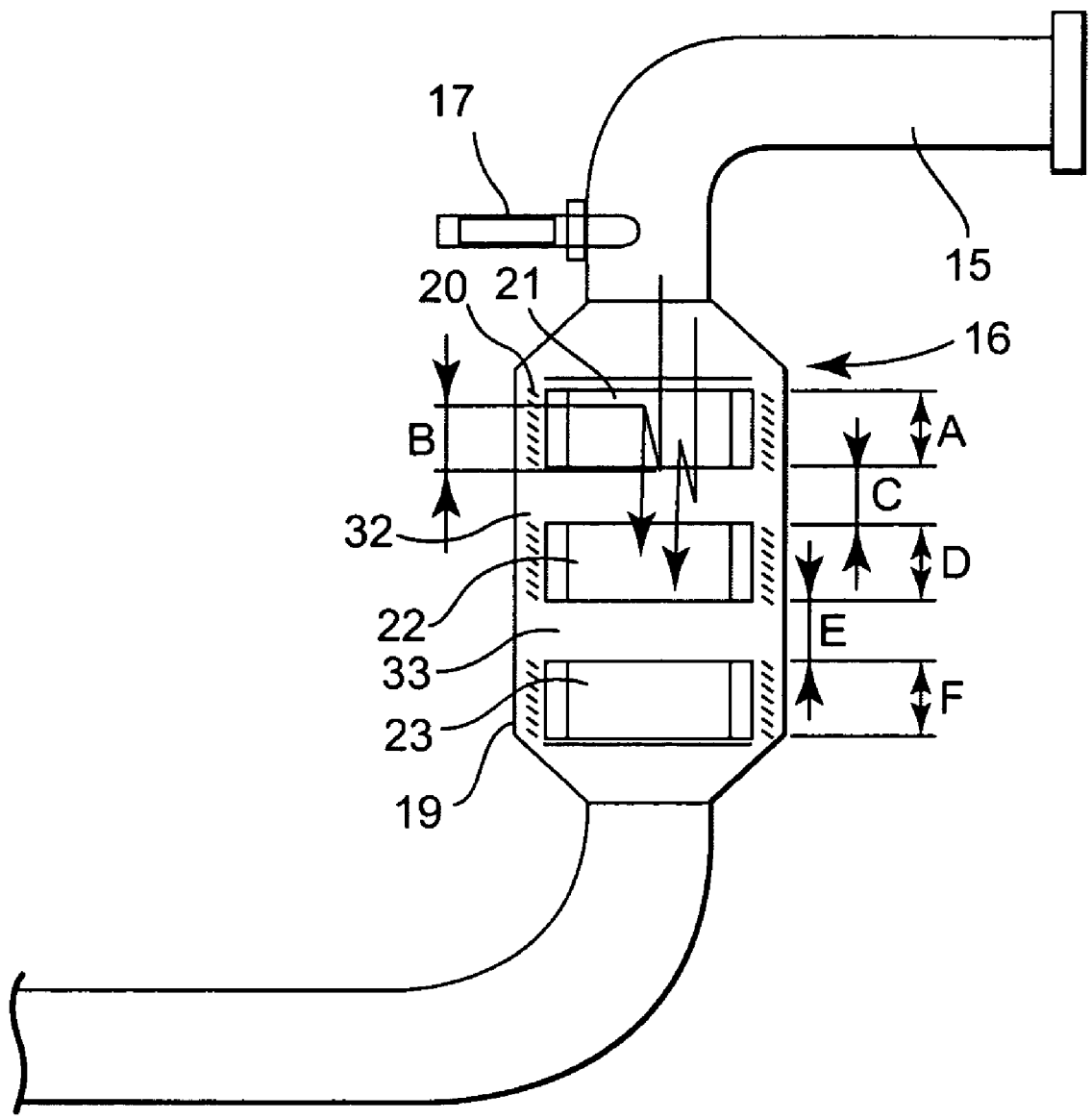
FIG. 5 is a schematic cross-sectional view of another exemplary a catalytic device.

FIG. 5 illustrates another exemplary embodiment of a catalytic device 16 including three catalyst carriers, 21, 22, and 23 respectively. The first catalyst carrier 21 is fixed in a position slightly upstream within the housing 19, the second catalyst carrier 22 is fixed in the middle of the housing 19, and the third catalyst carrier 23 is fixed in a position slightly downstream within the housing 19. A space 32 is maintained between the upstream catalyst carrier 21 and the middle catalyst carrier 22, and likewise, a space 33 is secured between the middle catalyst carrier 22 and the downstream catalyst carrier 23.

The lengths A, D of the upstream catalyst carrier 21 and the middle catalyst carrier 22, respectively, and the length C of the space 32 between the two are in the same relation as in the embodiment described above in FIG. 4 with respect to upstream distance B of the exhaust reverse-flow. In addition, in this embodiment, the longitudinal axial length E of the space 33 between the middle catalyst carrier 22 and the downstream catalyst carrier 23 (in other words, the distance between the end surfaces of the two catalyst carriers 22 and 23) is made substantially the same as or longer than the upstream distance B traveled by the exhaust reverse-flow generated by pulsations in the housing 19, preferably substantially the same length of the exhaust reverse-flow distance B.

As a result, exhaust gas that has passed through the middle catalyst carrier 22 flows back to the middle catalyst carrier 22 by reversing direction before reaching the downstream catalyst carrier 23. That is, without losing heat to the downstream catalyst carrier 23, the exhaust gas passes through the middle catalyst carrier 22 multiple times, and thus a greater priority is given to raise the temperature of the middle catalyst carrier 22 than the downstream catalyst carrier 23. Furthermore, the longitudinal axial length F of the downstream catalyst carrier 23 is, preferably in the same way as the upstream catalyst carrier 21, substantially the same as or shorter than the upstream length B of the exhaust reverse-flow.

Although catalyst device 16 has been described as having one, two, and three catalyst carrier(s) respectively, it is also possible to position more catalyst carriers in the housing 19, e.g., four, five, or more, in multiple levels.

Figure 6:
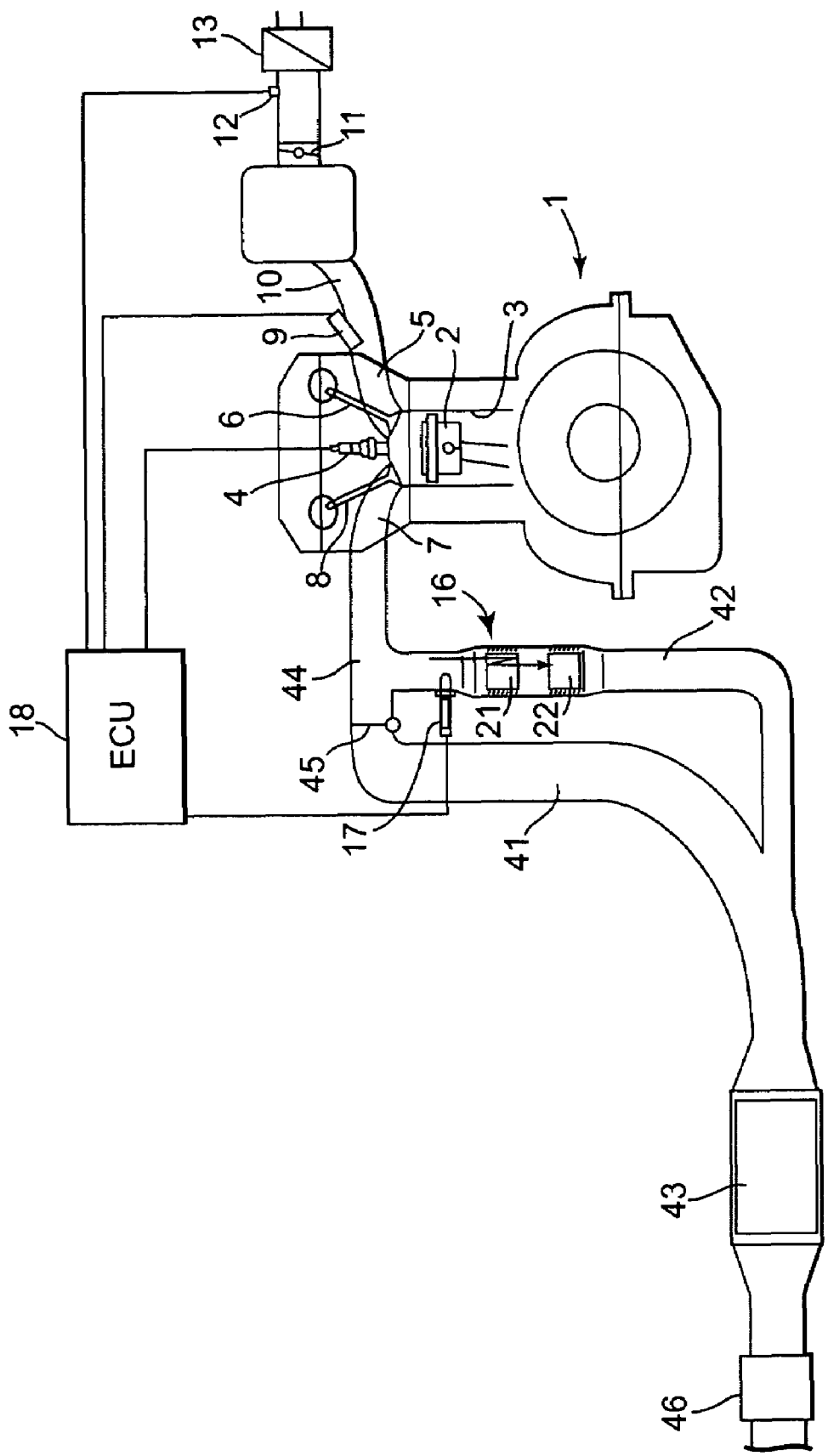
FIG. 6 is a schematic cross-sectional view of an exemplary exhaust system in which a catalytic device is installed in a bypass path.

FIG. 6 illustrates an exemplary configuration of an exhaust device in which a catalytic device 16 is installed in a bypass flow path. FIG. 6 illustrates an embodiment including a main flow path and a bypass flow path with a smaller path cross-section than a cross-section of the main flow path. A main flow path 41 is connected to the exhaust port 7 of the internal-combustion engine 1, the downstream end of which is opened to the outside of the vehicle via a muffler 46. A main catalytic device 43, in which a three-way catalyst may be used, is positioned under the floor of the vehicle. From a position that is relatively upstream in the main flow path 41, a bypass flow path 42 branches out, and the downstream end of the bypass flow path 42 merges into the main flow path 41 upstream of the main catalytic device 43. In addition, a bypass catalytic device 16 with a smaller capacity than the main catalytic device 43 may be positioned within the bypass flow path 42. This bypass catalytic device 16 has the same configuration (an example with two catalyst carriers 21 and 22 is illustrated in FIG. 6) as those in FIGS. 3-5 that have been previously described. Alternatively, a catalytic device may be located at a position upstream to the bypass assembly path.

Furthermore, further downstream from the branching point 44 of the bypass path 42 in the main exhaust path 41, a flow path directional control valve 45 may be installed to switch between the bypass flow path and the main flow path by opening and closing the main flow path 41.

The flow path directional control valve 45 may be equipped with an appropriate actuator such that the flow path directional control valve 45 closes when the engine temperature or exhaust temperature is still low after a cold engine start and the main exhaust path 41 is shut. As a result, the entire exhaust output generated by the engine 1 flows into the bypass catalytic device 16 through the bypass path 42. The bypass catalytic device 16 is positioned upstream in the exhaust system, close to the exhaust port 7, and may be made smaller to be rapidly activated and quickly start purifying the exhaust under cold start conditions.

On the other hand, as the engine warms up and the engine temperature or exhaust temperature becomes high enough, the flow path directional control valve 45 may open. As a result, the exhaust output from each cylinder may pass mainly through the main exhaust path 41 and through only the main catalytic device 43. At this time, the bypass path 42 side is not actually shut down; however, since the path cross-section of the bypass path 42 is smaller than that of the main exhaust path 41, due to the differences in flow resistance between the paths the majority of the exhaust flow passes through the main exhaust path 41 side, and may only slightly flow into the bypass path 42 side. This reduces heat deterioration of the bypass catalytic device 16.

In the embodiment of FIG. 6, the cross-section of the bypass path 42 and the cross-section of the housing 19 are smaller than the housing used in the embodiments shown in FIGS. 1-5, in which the housing 19 is placed in the main exhaust path. As a result, the diameter of the catalyst carriers 21, 22, and 23 decreases, while the length increases, compared to the exhaust system designs in which the housing is in the main exhaust path. As a result, the catalyst carriers 21, 22, and 23 may be placed in the housing 19, and the strength of the carriers is enhanced.

Furthermore, although not illustrated, the upstream part of the main flow path 41 to be connected to the exhaust port 7 may be configured as an exhaust manifold, and the main catalytic device 43 may be installed slightly downstream from the merging point at the downstream end of the manifold where the pipes from the individual cylinders merge into one flow path. The main flow path may consist of branch flow paths for each of a plurality of cylinders, and a main assembly path into which the branch flow paths merge into a single path. Moreover, regarding bypass flow path 42, the upstream part may consist of paths of individual cylinders, each of which branch out from the branch paths of the main flow path 41. The bypass flow path may consist of paths of individual cylinders that have branched out from the branch paths, and a bypass assembly path into which the paths of individual cylinders merge into a single path. The catalytic device 16 may be located immediately after the merging point where these four paths of individual cylinders merge into one.

Various embodiments of the invention have been described. These and other embodiments are within the scope of the following claims.

What is claimed is:

1. An exhaust system for an internal combustion engine, comprising:
   a catalytic device within an exhaust path of the engine, wherein the catalytic device includes a housing with a catalyst carrier, and wherein a length of the catalyst carrier along a longitudinal axis, measured along a downstream flow direction of exhaust gas within the exhaust path, is the same as or shorter than an upstream distance traveled by a reverse flow of exhaust gas during an exhaust gas pulsation within the housing, and wherein the catalyst carrier is spaced along the longitudinal axis from any other exhaust gas purifying device in the housing by a distance the same as or greater than the upstream distance traveled by the reverse flow;
   wherein the catalyst carrier includes a first catalyst carrier in the housing and a second catalyst carrier in the housing downstream from the first catalyst carrier, wherein a distance between the first catalyst carrier and the second catalyst carrier is substantially the same as the upstream distance traveled by the exhaust reverse-flow such that exhaust as that enters the second catalyst carrier does not enter the first catalyst carrier during reverse flow.

2. The exhaust system of claim 1, wherein each of the first and second catalyst carriers is substantially the same length as the upstream distance traveled by the exhaust reverse-flow.

3. The exhaust system of claim 1, wherein the upstream distance traveled by the exhaust reverse-flow is based on pulsations under low load engine conditions.

4. The exhaust system of claim 1, further comprising:
   an exhaust manifold that forms a first part of the exhaust path, wherein first part of the exhaust path has a plurality of branch paths of a plurality of cylinders of the internal combustion engine, and wherein the branch paths are merged into a single path at a downstream side of the exhaust manifold, and wherein the catalytic device is downstream of the exhaust manifold.

5. The exhaust system of claim 1, wherein the second catalyst carrier is substantially the same or a shorter length than the upstream distance traveled by the exhaust reverse-flow.

6. The exhaust system of claim 5, wherein the second catalyst carrier is substantially the same length as the upstream distance traveled by the exhaust reverse-flow.

7. The exhaust system of claim 1, further comprising at least one third catalyst carrier in the housing downstream from the second catalyst carrier, wherein the distance between the each of the catalyst carriers is substantially the same as or longer than the upstream distance traveled by the exhaust reverse-flow.

8. An exhaust system for an internal combustion engine, comprising:
   a catalytic device within an exhaust path of the engine, wherein the catalytic device includes a housing with a catalyst carrier, and wherein a length of the catalyst carrier along a longitudinal axis, measured along a downstream flow direction of exhaust gas within the exhaust path, is the same as or shorter than an upstream distance traveled by a reverse flow of exhaust gas during an exhaust gas pulsation within the housing, and wherein the catalyst carrier is spaced along the longitudinal axis from any other exhaust gas purifying device in the housing by a distance the same as or greater than the upstream distance traveled by the reverse flow; and
   at least one third catalyst carrier in the housing downstream from the second catalyst carrier wherein the distance between each of the catalyst carriers is substantially the same as the upstream distance traveled by the exhaust reverse-flow such that during reverse flow exhaust gas in the second catalyst carrier does not enter the first catalyst carrier and exhaust gas in the third catalyst carrier does not enter the second catalyst carrier.

9. The exhaust system of claim 7, wherein the length of each of the first, second and third catalyst carriers is substantially the same or a shorter than the upstream distance traveled by the exhaust reverse-flow.

10. The exhaust system of claim 9, wherein the length of each of the first, second and third catalyst carriers is substantially the same as the upstream distance traveled by the exhaust reverse-flow.

11. The exhaust system of claim 1, further comprising:
    a main flow path;
    a bypass flow path having a smaller path cross-section than a path-cross section of the main flow path; and
    a valve for switching between the main flow path and the bypass flow path, wherein the catalytic device is located in the bypass flow path.

12. The exhaust system of claim 11,
    wherein the main flow path comprises branch paths for each of a plurality of cylinders, and a main assembly path into which the branch paths merge into a single path, and
    wherein the bypass flow path comprises paths of individual cylinders that have branched out from the branch paths, and a bypass assembly path into which the paths of individual cylinders merge into a single path.

13. The exhaust system of claim 12, wherein the catalytic device is upstream of the bypass assembly path.

14. The exhaust system of claim 11, wherein the downstream ends of the bypass flow paths merge into the main flow path.

15. A method of purifying exhaust gas generated by an internal-combustion engine, comprising:
    providing a catalytic device in an exhaust path through which the exhaust gas flows, wherein the catalytic device comprises a catalyst carrier in a housing, and wherein the exhaust gas flows an upstream distance along an upstream flow direction during an exhaust gas pulsation within the housing;
    providing the catalyst carrier having a length, measured along a downstream flow direction of the exhaust gas along the exhaust path, the same or shorter than the upstream distance such that the exhaust gas reverses flow a first time near a downstream end of the catalyst carrier and reverses flow a second time near an upstream end of the catalyst carrier;

positioning the catalyst carrier spaced along the exhaust path from any other exhaust gas purifying device in the housing by the upstream distance or greater; and repeatedly flowing the exhaust gas through the carrier to increase the temperature of the catalytic device.

16. A method of purifying exhaust gas generated by an internal-combustion engine, comprising:

providing a catalytic device in an exhaust path through which the exhaust gas flows, wherein the catalytic device comprises a first catalyst carrier in a housing, and a second catalyst carrier in the housing arranged a predetermined distance along a longitudinal axis downstream of the first catalyst carrier, measured along a downstream flow direction of exhaust gas within the exhaust path, and wherein the exhaust gas flows a reverse flow distance in an upstream direction during an exhaust gas pulsation within the housing, and the first catalyst carrier has a length along a longitudinal axis, measured along a downstream flow direction of the exhaust gas within the exhaust path, substantially the same or shorter than the reverse flow distance such that the exhaust gas reverses flow a first time near a downstream end of the first catalyst carrier and reverses flow a second time near an upstream end of the first catalyst carrier;

selecting the predetermined distance between the first carrier and the second carrier to be substantially the same or longer than the reverse flow distance; and repeatedly flowing the exhaust gas through the first carrier to increase the temperature of the catalytic device.

17. The method of claim 16, wherein the second carrier has a length along a longitudinal axis, measured along the downstream flow direction, substantially the same or shorter than the reverse flow distance.

18. The method of claim 16, wherein at least one of the first carrier and the second carrier has a length along a longitudinal axis, measured along the downstream flow direction, substantially the same as the reverse flow distance.

19. A method of purifying exhaust gas generated by an internal-combustion engine, comprising:

providing a catalytic device in an exhaust path through which the exhaust gas flows, wherein the catalytic device comprises a first catalyst carrier in a housing, and a second catalyst carrier in the housing arranged a predetermined distance along a longitudinal axis downstream of the first catalyst carrier, measured along a downstream flow direction of exhaust gas within the exhaust path;

providing means for generating a reverse exhaust gas flow in the catalytic device, wherein the means for generating causes the exhaust gas to flow a reverse flow distance along an upstream direction during an exhaust gas pulsation within the housing;

selecting a length of the first carrier along a longitudinal axis, measured along a downstream flow direction of the exhaust gas within the exhaust path, to be substantially the same or shorter than the reverse flow distance such that the exhaust gas reverses flow a first time near a downstream end of the first carrier and reverses flow a second time near an upstream end of the first carrier;

selecting the predetermined distance between the first carrier and the second carrier to be substantially the same or longer than the reverse flow distance; and repeatedly flowing the exhaust gas through the first carrier to increase the temperature of the catalytic device.

* * * * *